H. J. HABER.
MACHINE FOR PREPARING GREEN WOOD FOR MAKING CHARCOAL.
APPLICATION FILED APR. 18, 1918.
1,372,136. Patented Mar. 22, 1921.
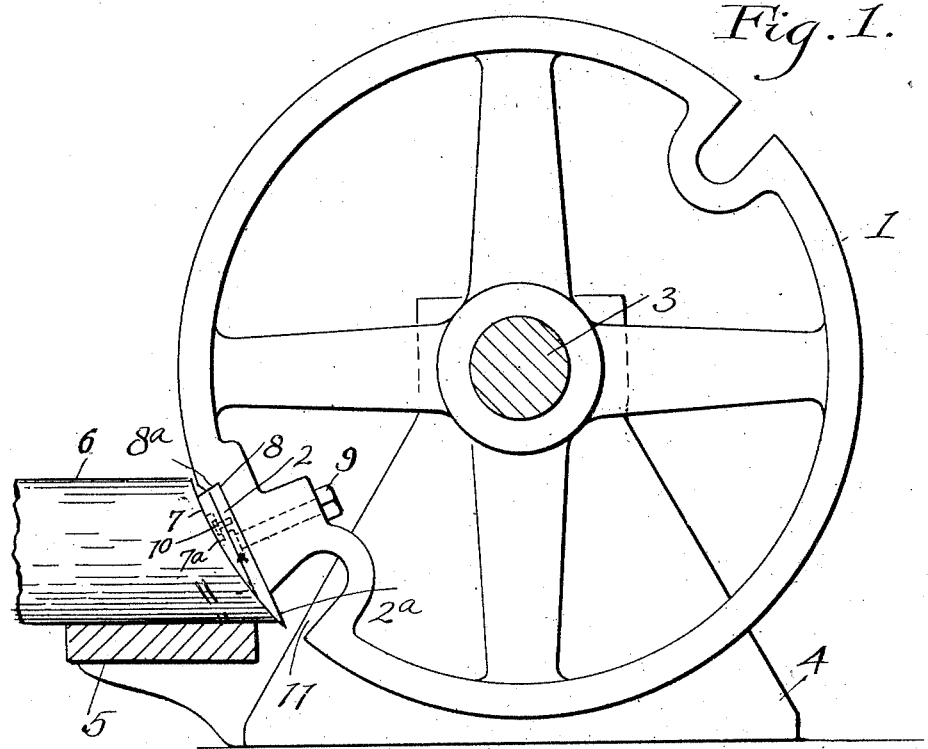
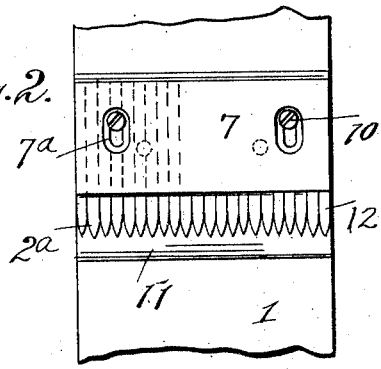
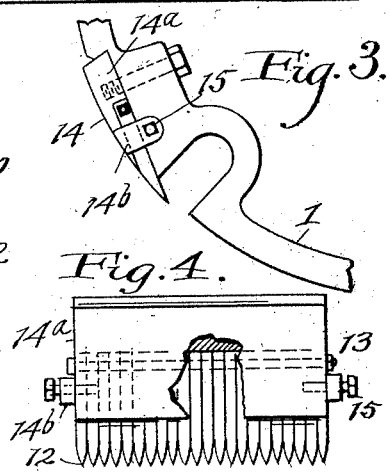
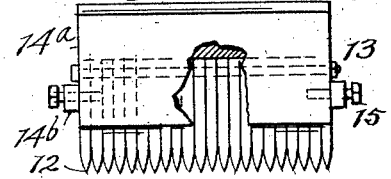
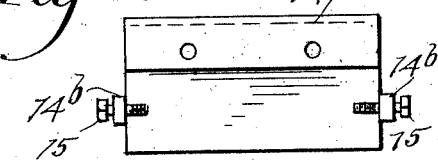

UNITED STATES PATENT OFFICE.

HENRY J. HABER, OF CLEVELAND, OHIO, ASSIGNOR OF THIRTY PER CENT. TO PAUL NORTH, THIRTY PER CENT. TO GEORGE M. POTTER, AND TEN PER CENT. TO WORTHINGTON HOYT, ALL OF CLEVELAND, OHIO.

MACHINE FOR PREPARING GREEN WOOD FOR MAKING CHARCOAL.

1,372,136.      Specification of Letters Patent.      Patented Mar. 22, 1921.

Application filed April 18, 1918. Serial No. 229,464.

*To all whom it may concern:*

Be it known that I, HENRY J. HABER, a citizen of the United States, residing at Cleveland, in the county of Cuyahoga and State of Ohio, have invented a certain new and useful Improvement in Machines for Preparing Green Wood for Making Charcoal, of which the following is a full, clear, and exact description.

The present invention has for its purpose and object the provision of a method and apparatus by which green wood may be worked into a form suitable for charring to make charcoal and after charring maintain certain physical properties imparted to it by the method of preparation which renders the charcoal particularly advantageous for use in the making of carbonizing compound.

In case hardening, and generally in the heat treatment of steel and other metals and alloys, charcoal forms an important element of the compound in which the steel or other metal is packed. With the charcoal there is used various chemical substances which in connection with the charcoal produce the desired effect in the metal subjected to heat treatment.

The mixtures of charcoal and the various chemicals to which reference has been made, are usually prepared in advance, and the making and selling of these so-called carbonizing compounds and case hardening compounds has developed into a distinct industry.

In the making of carbonizing compounds, charcoal of a size known in the trade as No. 4 charcoal, which is approximately the size of a pea or bean, has been found to be the most desirable, but it has been found exceedingly difficult to secure a thorough uniform mixture of charcoal and the chemical substances added to it. Attempts to cause the impregnation of the charcoal by solutions in which the chemical substances were directly in solution or in suspension have heretofore been but indifferently successful except upon long soaking which has very decided disadvantages.

Charcoal is ordinarily known as a porous body and apparently solutions should more or less readily penetrate the charcoal.

I have discovered that although charcoal is a porous body, that the present methods in vogue for the making of charcoal of the size required for case hardening compounds, to-wit, by grinding large pieces of charcoal and screening the product, results in working into the pores of the charcoal thus prepared, a large amount of dust which effectively clogs the pores of the charcoal and materially hinders the absorption of the chemical substances in solution or in suspension. The method disclosed in this application is therefore directed toward preparing green wood by separating strips from larger masses of wood in such a fashion as to leave the surfaces of the severed strip roughened, which will produce upon subsequent charring a porous body with pores which are not filled with charcoal dust. The strip is of such size that it readily breaks into pieces of proper size to produce what is commercially known as No. 4 charcoal.

A strip produced with the roughened surfaces in its green state also enables an easier and quicker charring than where wood is charred *en bloc*. The roughened surfaces permit the distillation products to pass away from the remaining mass with great ease, and by dividing the wood into small strips in the fashion indicated also is of advantage in quick charring. However, it is not the small size alone which produces the advantages, but it is the small size of strips plus the fact that the surfaces of the green wood strips are in roughened and porous condition.

Reference should be had to the accompanying drawing forming a part of this specification in which Figure 1 is a side elevation of a machine by which the method herein disclosed may be carried out; Fig. 2 is a plan view of a portion of the machine showing the gouging tools; Fig. 3 is a side elevation showing a different form of tool arrangement; Fig. 4 is a plan view with portions in section showing gouging tools; and Fig. 5 is a plan view of a plate for holding the gouging tools.

In practising my invention, strips of wood are gouged from a larger piece of wood, such as a log, by removing the strips of wood transversely of the grain of the log or piece of wood, and further in gouging the strips in such a manner that the surfaces of the strips are in roughened condition, which, of course, induces porosity, and this condition persists during the charring of the green wood so that the final product has surfaces which are porous.

Due to the fact that the strips of wood are severed transversely or across the grain of the wood, the strips have planes of parting which extend transversely with respect to the axis of the strip, so that they may readily break up into small pieces, and by cutting the strip of wood of proper size, the resultant small pieces when the charred strips are broken up, produce in large measure, a charcoal of a size known commercially as No. 4 charcoal.

Great stress is laid upon the fact that the charcoal produced by this method, is in its finished state substantially free from dust, and there is nothing in the course of its preparation which requires grinding. Therefore the pores of the charcoal are left open, and by so much the charcoal is in much better condition to absorb solutions or suspensions in water of the chemicals with which it is desired to impregnate the charcoal in the making of carbonizing compounds.

Referring to the drawings, 1 indicates a rotating annular body which carries a plurality of gouging instruments, one of which is indicated at 2. Other gouges may be mounted upon the annular member 1 in a manner similar to that about to be described. The annular member is mounted upon a shaft 3 which is suitably journaled upon supporting standards, one of which is indicated at 4.

Adjacent the annular member there is a platform 5, adapted to support a log or block of wood indicated at 6. The block or log thus is fed toward the annular member 1, as the apparatus is operated in any desired manner, that is to say, either by an operator or by some mechanical means.

The gouge 2 comprises a member provided with a plurality of pointed portions or parts indicated at 2ª, each of these providing a sharp point with diverging edges which serve to gouge the wood from the block as the gouges pass in contact therewith.

Superimposed upon the gouge 2 is a plate 7, this plate being of a rounding contour, and at its forward edge lies adjacent the rear portion of the pointed elements 2ª of the gouge, thereby in effect forming a continuous surface. This plate is slightly adjustable upon the gouge 2 by virtue of the slotted openings 7ª.

The annular member 1 is provided with a depression 8, the bottom of which slants with respect to the surface of the annular member so that at the rear portion of the depression there is a shoulder indicated at 8ª, against which the rear edges of the gouge member 2 and the plate 7 abut.

The gouge member 2 is secured to the annular member 1 by means of a bolt 9 which extends through the gouge member and through the thickened or heavier portion of the annular member 1, and the plate 7 is held to the gouge member 2 by means of bolts indicated at 10.

In the annular member 1 there is a recess 11, this recess lying adjacent the depressed portion 8 in the annular member, the recess extending radially with respect to the annular member. The gouge member extends over, or in part overlies this recess. This construction is of decided advantage in that the gouged strips have a clearance or free way in which they can move after severance by the gouges.

In setting the gouge members 2, the forward edge is set to be slightly above the curved plane of the member 1, so as to insure proper operative contact with the wooden block. The plate 7 is so fashioned that it extends substantially flush with the annular surface of the member 1 which is just behind it. Therefore, after the gouge member has contacted with the log and performed its gouging operation, the plate 7 prevents the log or piece of wood from wedging which might be sufficient to stop the rotation of the annular member 1.

In Figs. 3, 4 and 5 there is shown a slightly different construction of the gouge and its associated parts.

Each gouging element 12 is a separate piece and in forming a complete gouge member, a number of gouges 12 are arranged adjacent each other and secured together by a cross bolt 13.

Coöperating with the gouges, is a cap 14 which has an extension 14ª which fits behind the gouges and engages with the shoulder 8ª of the depression 8.

The plate 14 overlies the gouges in part, and holds them to the member 1. The plate 14 has ears 14ᵇ which depend upon opposite sides of the gouges, which ears by means of machine bolts 15 are held to the member 1, the machine bolts being threaded into suitable openings in the opposite sides of member 1.

The ears 14ᵇ not only serve to secure the front end of plate 14 to the member 1, but also serve to prevent sidewise displacement of the gouges.

Having described my invention, I claim:

1. In apparatus of the character described, a bit carrier, a bit secured to the bit carrier, a retainer for the said bit having a rounding outer surface which lies slightly above the surface of the bit carrier.

2. In apparatus of the character described, a bit carrier having a surface with a depression therein, a bit secured in the said depression, a plate having an outer rounding surface, said plate overlying the bit, the outer surface of the plate being rounded and lying slightly above the surface of the carrier.

3. In apparatus of the character described, a bit carrier having a surface with a depression therein, which depression at one end is flush with the surface of the carrier and at its other end forms a wall, a bit in said depression, a plate having an extension which engages the rear end of the bit and the wall of the recess, said plate overlying the bit and provided with means by which it is secured to the carrier adjacent its forward end, and means for securing the plate to the carrier at another portion thereof.

4. In apparatus of the character described, a bit carrier having a surface with a depression therein, which depression at one end is flush with the surface of the carrier, and at its other end forms a wall, a bit in said depression, a plate having an extension against which the end of the bit abuts and which lies between the end of the bit and the wall of the depression, said plate overlying the bit and provided with ears which overlie the sides of the bit, means for securing the ears to the carrier, and means for otherwise securing the plate to the carrier.

5. In apparatus of the character described, a bit carrier having a surface with a depression therein, which depression is flush with the surface of the carrier at one end, and at its other end forms a wall, a bit comprising a plurality of individual bits in said depression, a plate having a part which lies between the ends of the bits and the wall of the depression, said plate overlying the bits and having ears which extend over the end bits, and means for securing the plate to the carrier.

In testimony whereof, I hereunto affix my signature.

HENRY J. HABER.